(12) United States Patent
Kim (10) Patent No.: US 10,188,260 B2
(45) Date of Patent: Jan. 29, 2019

(54) DISHWASHER COMPRISING A SEALING APPARATUS

(71) Applicant: Samsung Electronics Co., Ltd., Gyeonggi-do (KR)

(72) Inventor: Jin-doo Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 605 days.

(21) Appl. No.: 14/817,967

(22) Filed: Aug. 4, 2015

(65) Prior Publication Data

US 2016/0029871 A1 Feb. 4, 2016
US 2017/0296029 A9 Oct. 19, 2017

(30) Foreign Application Priority Data

Aug. 4, 2014 (KR) .................. 10-2014-0099963

(51) Int. Cl.
*A47L 15/42* (2006.01)
*F16J 15/02* (2006.01)
*F16J 15/06* (2006.01)

(52) U.S. Cl.
CPC ....... *A47L 15/4225* (2013.01); *A47L 15/4259* (2013.01); *A47L 15/4263* (2013.01); *F16J 15/025* (2013.01); *F16J 15/061* (2013.01)

(58) Field of Classification Search
CPC .............. A47L 15/4225; A47L 15/4259; A47L 15/4263; F16J 15/025; F16J 15/061

USPC ........................................................ 134/184
See application file for complete search history.

(56) References Cited

U.S. PATENT DOCUMENTS

| 2004/0041354 | A1* | 3/2004 | Derr ................. | F16J 15/061 277/628 |
| 2006/0219272 | A1* | 10/2006 | Lee ................... | A47L 15/4204 134/56 D |
| 2012/0284994 | A1* | 11/2012 | Crompton .......... | F16L 37/0915 29/455.1 |

FOREIGN PATENT DOCUMENTS

KR    10-2006-0106155 A    10/2006

OTHER PUBLICATIONS

Office Action dated Jul. 24, 2018 in connection with Korean Patent Application No. 10-2014-0099963, 8 pages.

\* cited by examiner

*Primary Examiner* — Spencer E Bell
*Assistant Examiner* — Tinsae B Ayalew

(57) ABSTRACT

A sealing apparatus seals between a pump chamber and a bottom surface of a washing tank of a dishwasher. The sealing apparatus includes a packing member disposed along a top portion of the pump chamber and a protecting member which fixes some portion of the packing member to the pump chamber to prevent the packing member from moving when the bottom surface of the washing tank and the pump chamber are coupled to each other.

15 Claims, 13 Drawing Sheets

DISHWASHER COMPRISING A SEALING APPARATUS

CROSS-REFERENCE TO RELATED APPLICATION(S) AND CLAIM OF PRIORITY

The present application is related to and claims priority from Korean Patent Application No. 10-2014-0099963 filed Aug. 4, 2014 in the Korean Intellectual Property Office, the disclosure of which is incorporated herein by reference in its entirety.

TECHNICAL FIELD

The present disclosure relates to a dishwasher comprising a sealing apparatus. More particularly, the present disclosure relates to a sealing apparatus for preventing leakage between a pump chamber and a bottom surface of a washing tank of a dishwasher.

BACKGROUND

Generally, a dishwasher includes a main body having a front surface in which an input opening for inputting dishes is formed, a washing tank which is provided inside the input opening, and a door for opening and closing the input opening. The washing tank includes a rack for receiving dishes and top and bottom nozzles that spray water to the dishes in the rack so as to wash dirt from the dishes.

A conventional dishwasher includes a pump chamber disposed below the washing tank. In order to prevent leakage between a bottom surface of the washing tank and the pump chamber connected to the bottom surface of the washing tank, a seal ring is disposed in a connecting portion between the bottom surface of the washing tank and the pump chamber.

In the conventional dishwasher, when the bottom surface of the washing tank and the pump chamber are connected with each other in the assembly of the dishwasher, the seal ring, which is seated in a top portion of the pump chamber, is moved due to friction with the bottom surface of the washing tank so that the entire seal ring may be separated completely or at least a portion of the seal ring may be separated partially from the top portion of the pump chamber. Accordingly, this separation causes a problematic gap between the bottom surface of the washing tank and the top portion of the pump chamber. Since the pump chamber is not fully sealed to the bottom surface of the washing tank, washing water of the washing tank leaks through the gap.

SUMMARY

The present disclosure has been developed in order to overcome the aforementioned drawbacks and other problems associated with the conventional arrangement. An aspect of the present disclosure relates to a sealing apparatus that prevents a packing member secured to a top portion of the pump chamber from being moved by friction with the bottom surface of the washing tank when a bottom surface of a washing tank and a pump chamber are coupled to each other. This prevents the packing member from being separated from the top portion of the pump chamber.

Another aspect of the present disclosure relates to a sealing apparatus that guides water from an outer surface of a bottom surface of a washing tank to a channel formed on a top portion of a pump chamber.

To address the above-discussed deficiencies, it is a primary object to provide, for use in a dishwasher, a sealing apparatus that seals between a pump chamber and a bottom surface of a washing tank of a dishwasher. The sealing apparatus includes a packing member disposed along a top portion of the pump chamber and a protecting member which affixes some portion of the packing member to the pump chamber to prevent the packing member from moving when the bottom surface of the washing tank and the pump chamber are coupled to each other.

The protecting member is coupled to the pump chamber such that it is detachable, and the protecting member may include a plurality of hooks that are snap-coupled to a portion of the pump chamber.

The protecting member includes a first portion that covers an upper portion of the packing member and a second portion formed with the plurality of hooks.

The first portion includes an inclined surface that corresponds to a slope of the bottom surface of the washing tank. The second portion surrounds an outer circumference of the top portion of the pump chamber.

The first portion includes at least one discharge passage that guides water from an outer surface of the bottom surface of the washing tank to a channel formed in the pump chamber.

In certain embodiments, the at least one discharge passage includes at least one drain hole that passes through the first portion in a vertical direction. In other embodiments, the at least one discharge passage is a cutting groove that is formed by cutting a step portion formed in a bottom surface of the first portion in a horizontal direction.

The packing member includes a hooking portion that extends from the packing member to the channel of the pump chamber. The protecting member includes a first portion to cover the hooking portion and a second portion that is formed with a plurality of hooks to be snap-coupled to a portion of the pump chamber.

According to another aspect of the present disclosure, a dishwasher includes a main body comprising a washing tank which receives items to be washed; a pump chamber connected with a bottom surface of the washing tank such that fluid can pass between the washing tank and the pump chamber; a door that opens to reveal an interior portion of the washing tank and closes to seal the washing tank; and a sealing apparatus for sealing the pump chamber to the bottom surface of the washing tank, wherein the sealing apparatus includes a packing member disposed along a top portion of the pump chamber and a protecting member which affixes a portion of the packing member to the pump chamber in order to prevent the packing member from moving when the bottom surface of the washing tank and the pump chamber are coupled to each other.

Other objects, advantages and salient features of the present disclosure will become apparent from the following detailed description, which, taken in conjunction with the annexed drawings, discloses preferred embodiments.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged dishwasher. Hereinafter, certain exemplary embodiments of the present disclosure will be described in detail with reference to the accompanying drawings.

The components defined herein, such as a detailed construction and elements thereof, are provided to assist in a comprehensive understanding of this description. Thus, it is apparent that exemplary embodiments may be carried out without those defined components. Also, well-known functions or constructions are omitted to provide a clear and concise description of exemplary embodiments. Further, dimensions of various elements in the accompanying drawings may be arbitrarily increased or decreased for assisting in a comprehensive understanding.

Hereinafter, configuration of a sealing apparatus according to an embodiment of the present disclosure and a dishwasher comprising a sealing apparatus will be described.

Figure 1:
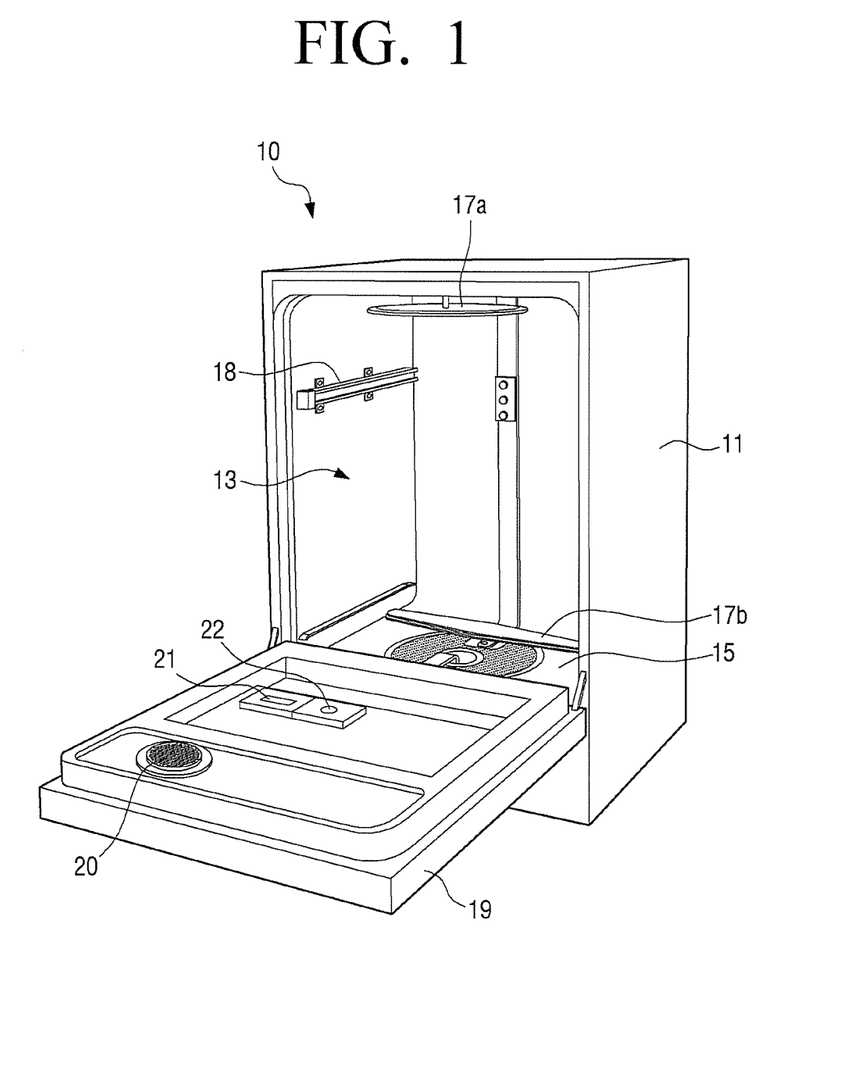
FIG. 1 is a perspective view illustrating a dishwasher comprising a sealing apparatus according to an embodiment of the present disclosure.
Figure 2:
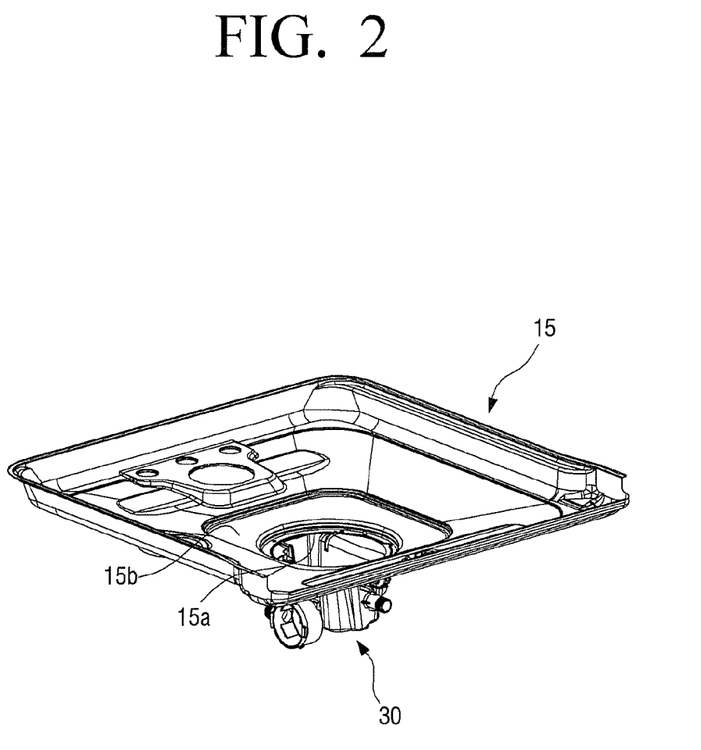
FIG. 2 is a perspective view illustrating a sealing apparatus, according to an embodiment of the present disclosure, disposed between a bottom surface of a washing tank and a top portion of a pump chamber.
Figure 3:
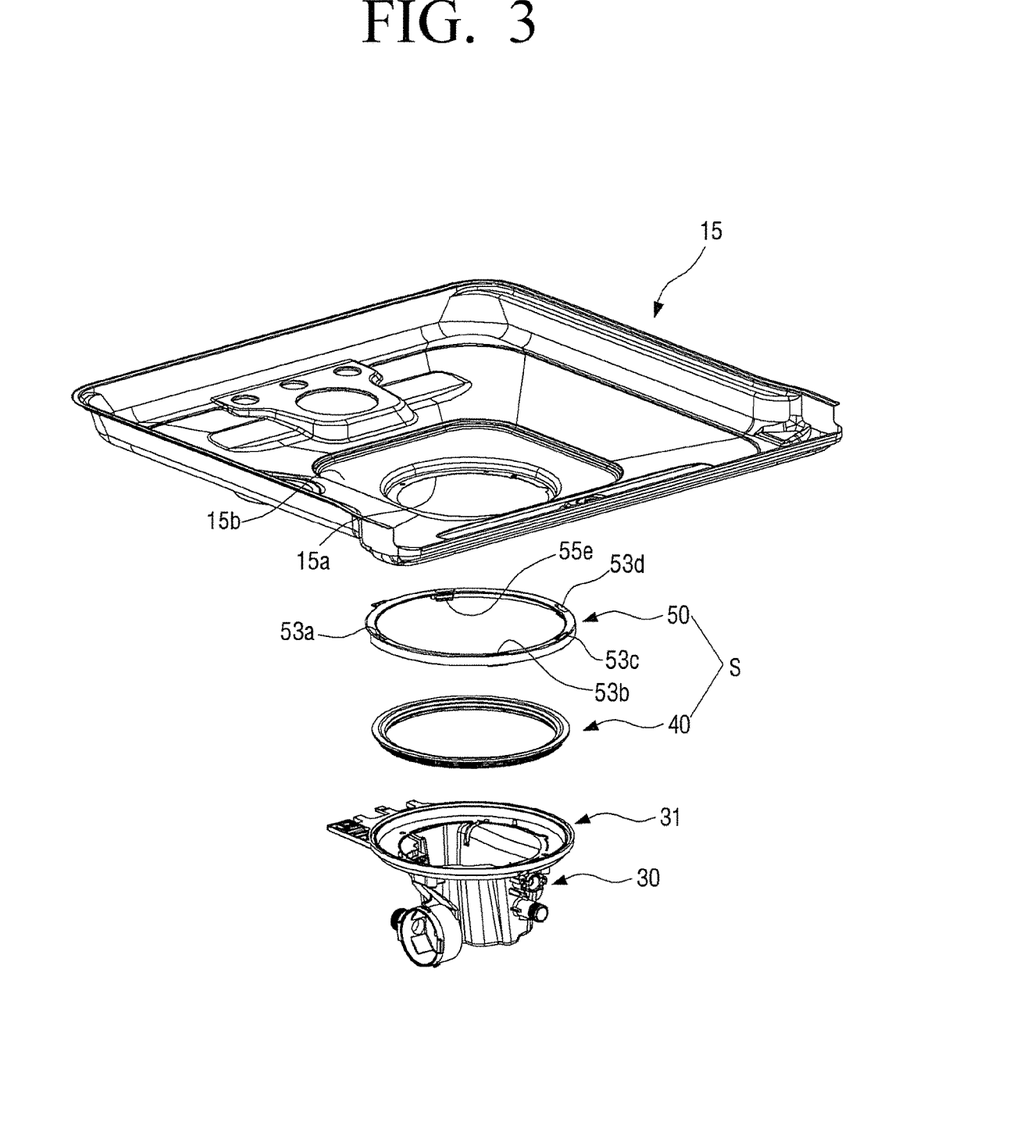
FIG. 3 is an exploded perspective view illustrating a sealing apparatus, according to an embodiment of the present disclosure, with a bottom surface of a washing tank and a pump chamber.

Referring to FIG. 1, a dishwasher 10, according to an embodiment of the present disclosure, includes a main body 11, a washing tank 13 formed inside the main body 11, a door 19 for opening and closing the washing tank 13, a pump chamber 30 (see FIG. 2) in which a pump (not illustrated) is built, and a sealing apparatus S (see FIG. 3).

The main body 11 is provided with the pump chamber 30 that is connected with a bottom surface 15 of the washing tank 13 such that fluid can pass between the washing tank 13 and the pump chamber 30. Top nozzle 17a and bottom nozzle 17b, which spray water toward dishes in the washing tank 13, are disposed inside the main body 11 such that they rotate. Also, the main body 11 includes a pair of rails 18 that support a rack (not illustrated) which receive dishes. The pair of rails 18 are disposed on opposite side walls of the washing tank 13.

The door 19 includes a steam outlet 20 for discharging steam inside the washing tank 13 after washing, a detergent injecting part 21 for injecting detergent, and a rinse solution injecting part 22 for injecting rinse solution.

The dishwasher 10, as shown in FIG. 1, is an example for explaining the present disclosure, so certain embodiments can alternatively be formed as a built-in type dishwasher. In certain embodiments, depending on the size of the washing tank 13, a middle nozzle (not illustrated) is disposed in addition to the top and bottom nozzles 17a and 17b. In some embodiments, a separate nozzle (not illustrated) for spraying water is disposed in a side wall of the washing tank. Also, the door 19 is not limited to being formed as a single door. In certain embodiments, the door 19 is formed as a pair of doors (not illustrated) which are hinge-coupled to a top end and a bottom end of the main body 11, respectively. Additionally, in some embodiments the door 19 is formed to have no steam outlet 20.

Referring to FIG. 2, the bottom surface 15 of the washing tank 13 is provided with an opening 15a that is connected with the pump chamber 30 such that fluid can pass between the washing tank 13 and the pump chamber 30. A peripheral portion 15b of the opening 15a has a predetermined slope toward the pump chamber 30 so that water used in the washing tank 13 is guided to the opening 15a.

The pump chamber 30 collects washing water (or water mixed with detergent) which is collected along the bottom surface 15 of the washing tank 13, and a pump (not illustrated) disposed in the pump chamber 30 sprays the collected washing water toward dishes through the top and bottom nozzles 17a and 17b.

Figure 4:
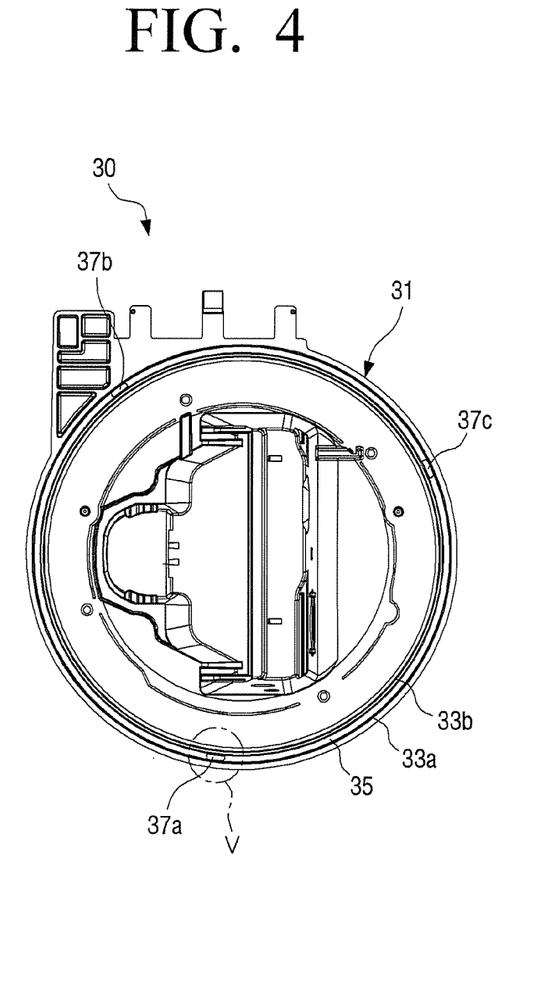
FIG. 4 is a plan view illustrating the pump chamber of FIG. 3.
Figure 5:
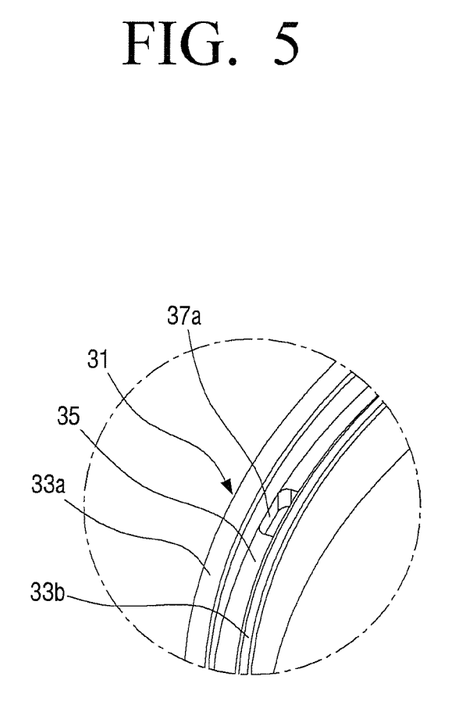
FIG. 5 is a partially enlarged perspective view illustrating a V portion of FIG. 3.

Referring to FIG. 3, the pump chamber 30 includes a top portion 31 that is open and is formed in a substantially circular shape. In certain embodiments, the top portion 31 of the pump chamber 30 includes, as illustrated in FIGS. 4 and 5, an outer protrusion 33a and an inner protrusion 33b which is formed inside the outer protrusion 33a and is spaced a predetermined interval apart from the outer protrusion 33a. A channel 35 is formed between the outer protrusion 33a and the inner protrusion 33b, and a plurality of drain holes 37a, 37b, and 37c are formed at intervals in the channel 35.

The channel 35 collects water droplets which are formed on an outer surface 15c (see FIG. 11) of the bottom surface 15 of the washing tank 13 or flow down along the outer surface 15c due to temperature difference between an inner side and an outer side of the washing tank 13 during washing of the dishes, and is connected with a discharge passage for discharging water outside the dishwasher 10 such that fluid can pass between the channel 35 and the discharge passage.

Hereinafter, configuration of a sealing apparatus S according to an embodiment of the present disclosure will be explained in detail with reference to FIGS. 3, and 6 to 11.

Referring to FIG. 3, the sealing apparatus S is disposed in an interconnecting portion between the bottom surface 15 of the washing tank 13 and the top portion 31 of the pump chamber 30. The sealing apparatus S includes a packing member 40 and a protecting member 50.

Figure 11:
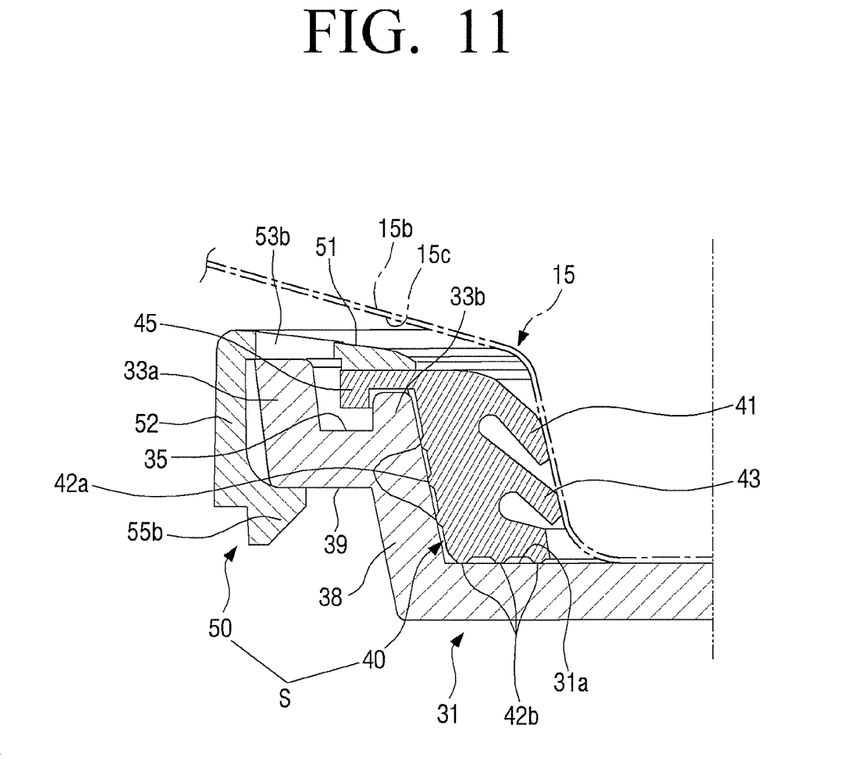
FIG. 11 is a partial cross-sectional view taken along an XI-XI line in FIG. 10.

The packing member 40 is formed in a substantially ring shape, and serves to prevent leakage between the bottom surface 15 of the washing tank 13 and the top portion 31 of the pump chamber 30. For this, the packing member 40, as illustrated in FIG. 11, is received in a receiving groove 31a of the top portion 31 of the pump chamber 30, and a portion of the packing member 40 is held in place by the protecting member 50.

Also, the packing member 40 is disposed so that an outer circumferential surface of the packing member 40 is in close contact with an inclined wall 38 of the top portion 31 of the pump chamber 30 and a bottom surface of the packing member 40 is in close contact with a bottom surface of the receiving groove 31a. Simultaneously, a first sealing projection 41 of the packing member 40 and a second sealing projection 43 of the packing member 40 are formed in two rows, offset vertically, along an inner circumferential surface of the packing member 40. The first and second sealing projections 41 and 43 are in close contact with the bottom surface 15 of the washing tank 13 to keep airtightness of the bottom surface 15 of the washing tank 13.

In some embodiments, the packing member 40 includes a hooking portion 45 extending along an upper portion of an outer circumferential surface of the packing member 40. The hooking portion 45 is coupled to the inner protrusion 33b formed in the top portion 31 of the pump chamber 30 so that the packing member 40 is physically connected to and stably affixed to the top portion 31 of the pump chamber 30.

Also, the packing member 40 includes a plurality of first small sealing protrusions 42a which are in close contact with the outer side surface of the inclined wall 38 of the top portion 31 of the pump chamber 30 along the outer circumferential surface of the packing member 40 and a plurality of second small sealing protrusions 42b which are in close contact with the bottom surface of the inclined wall 38 of the top portion 31 of the pump chamber 30 along the bottom surface of the packing member 40.

Figure 8:
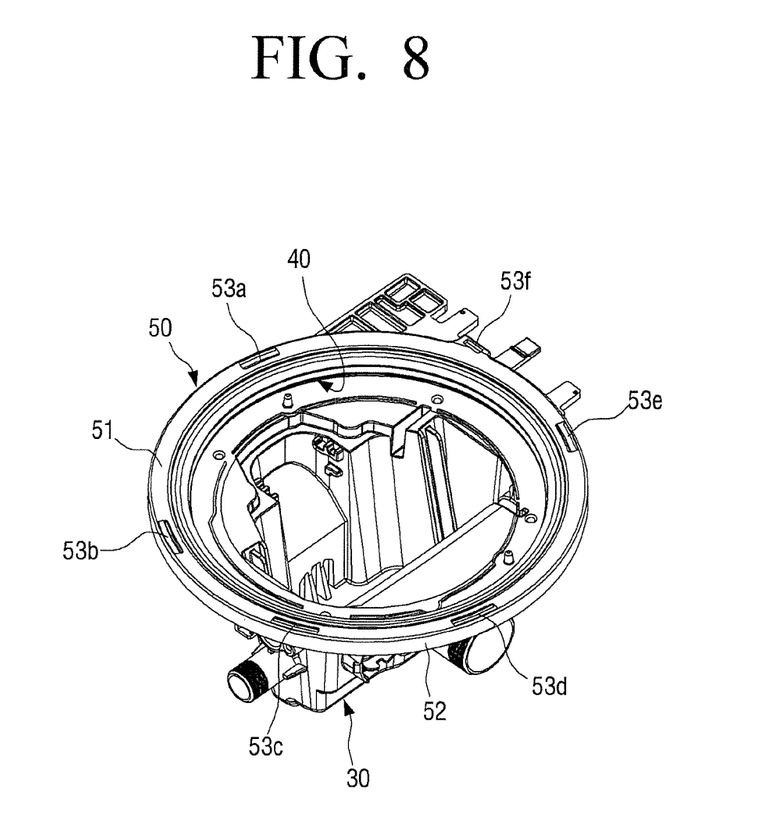
FIG. 8 is a top perspective view illustrating a sealing apparatus, according to an embodiment of the present disclosure, coupled to a top portion of a pump chamber.

The protecting member 50 is, as illustrated in FIG. 8, coupled to the top portion 31 of the pump chamber 30 such that the protecting member 50 covers a portion of the packing member 40 received in the receiving groove 31a of the top portion 31 of the pump chamber 30.

Figure 6:
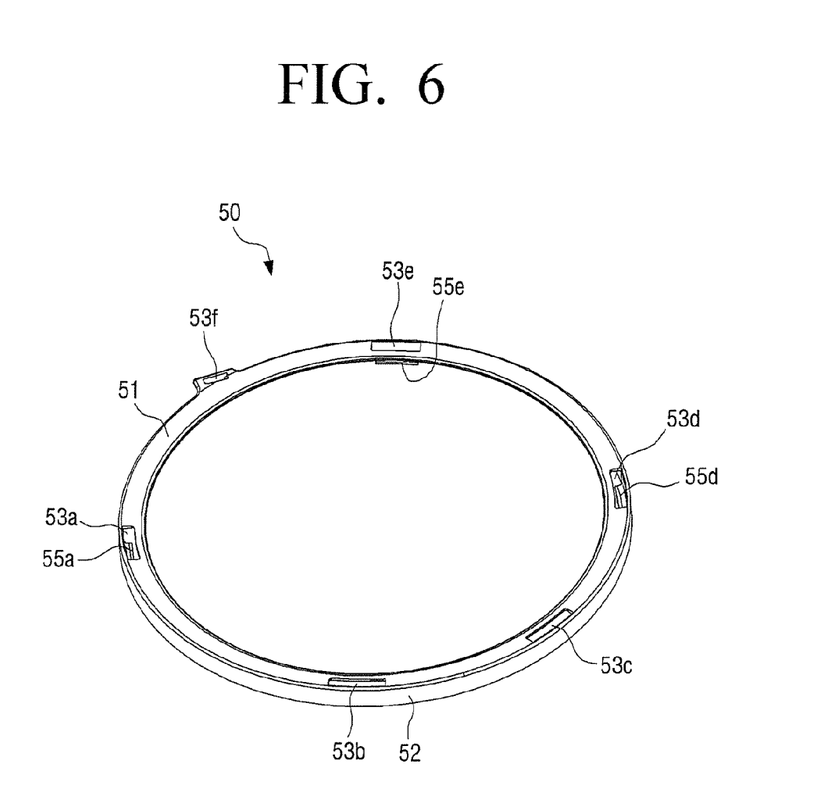
FIG. 6 is a top perspective view illustrating a protecting member of a sealing apparatus according to an embodiment of the present disclosure.

Referring to FIG. 6, the protecting member 50 includes a first portion 51 which is formed in a substantially ring shape and covers the portion of the packing member 40, and a second portion 52 that extends downward from an outer circumferential end of the first portion 51.

The top surface of the first portion 51 is, as illustrated in FIG. 11, inclined at an angle similar to that of the peripheral portion 15b of the bottom surface 15 of the washing tank 13. The inclined top surface of the first portion guides water droplets which are formed on the outer surface 15c of the bottom surface 15 of the washing tank 13 or flow along the outer surface 15c inside the protecting member 50.

Also, a plurality of drain holes 53a, 53b, 53c, 53d, 53e, and 53f are formed at predetermined intervals in the first portion 51. In FIG. 6, the first portion 51 is shown having six (6) drain holes, but the number of the drain holes is not limited thereto. The first portion 51 includes at least one drain hole. If the first portion 51 includes only a single drain hole, the length of the drain hole may be formed to be longer than that of each of the drain holes when the first portion 51 is provided with a plurality of drain holes.

The plurality of drain holes 53a, 53b, 53c, 53d, 53e, and 53f are formed to vertically pass through the first portion 51 and discharge water droplets falling directly from the outer surface 15c of the bottom surface 15 of the washing tank 13 to the channel 35. On the other hand, when an amount of water which has gathered between the upper portion of the packing member 40 and the bottom surface 15 of the washing tank 13 along the outer surface 15c of the bottom surface 15 of the washing tank 13 is increased gradually, water overflows toward the first portion 51, and then discharges to the channel 35 through the plurality of drain holes 53a, 53b, 53c, 53d, 53e, and 53f.

Also, when the protecting member 50 is coupled to the top portion 31 of the pump chamber 30, the first portion 51 allows the packing member 40 to be stably affixed to the pump chamber 30 by pressing the hooking portion 45 of the packing member 40 which is previously coupled to the top portion 31 of the pump chamber 30.

As a result, when the packing member 40 is seated in the top portion 31 of the pump chamber 30 and the bottom surface 15 of the washing tank 13 is assembled to the pump chamber 30, even if the bottom surface 15 of the washing tank 13 is rubbed against the first and second sealing projections 41 and 43 of the packing member 40 or pushes the inner side of the packing member 40 in any direction, the packing member 40 will stay affixed in the coupling position of the top portion 31 of the pump chamber 30.

Accordingly, the sealing apparatus S according to the present embodiment provides a leak-proof structure with reliability between the bottom surface 15 of the washing tank 13 and the top portion 31 of the pump chamber 30 by preventing the packing member 40 from moving from the coupling position during assembly of the bottom surface 15 of the washing tank 13 to the top portion 31 of the pump chamber 30.

Figure 7:
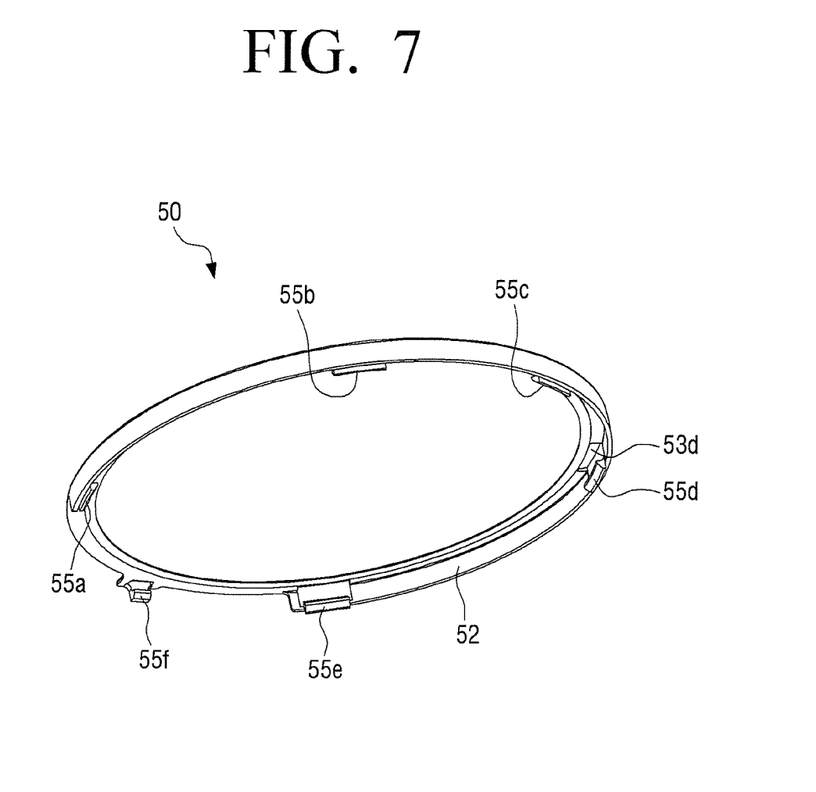
FIG. 7 is a bottom perspective view illustrating a protecting member of a sealing apparatus according to an embodiment of the present disclosure.

Referring to FIG. 7, a plurality of hooks 55a, 55b, 55c, and 55d project at predetermined intervals from the inner circumferential surface of the second portion 52 toward the center of the protecting member 50. Also, an additional hook 55f is formed to extend from the bottom surface of the first portion 51.

In certain embodiments, hook 55f is formed in the first portion 51 or in the second portion 52 depending on the structure of the top portion 31 of the pump chamber 30. In some embodiments, the hook 55f is entirely omitted.

In some embodiments, the plurality of hooks 55a, 55b, 55c, 55d, 55e, and 55f are disposed at positions corresponding to the plurality of drain holes 53a, 53b, 53c, 53d, 53e, and 53f, respectively. In other embodiments, the plurality of hooks 55a, 55b, 55c, 55d, 55e, and 55f and the plurality of drain holes 53a, 53b, 53c, 53d, 53e, and 53f may be disposed at positions that do not correspond to each other.

Figure 9:
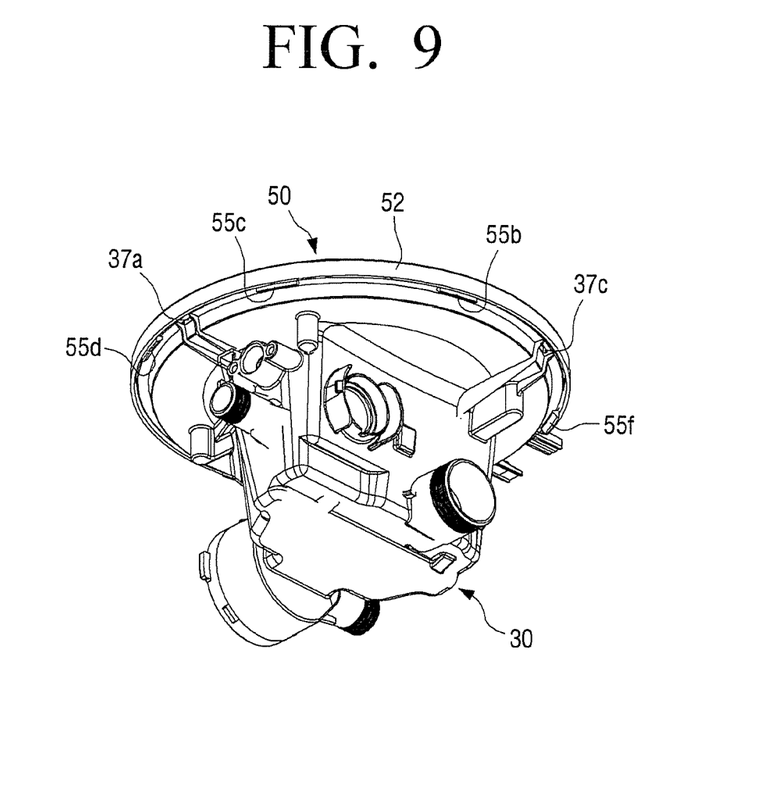
FIG. 9 is a bottom perspective view illustrating a sealing apparatus, according to an embodiment of the present disclosure, coupled to a top portion of a pump chamber.
Figure 10:
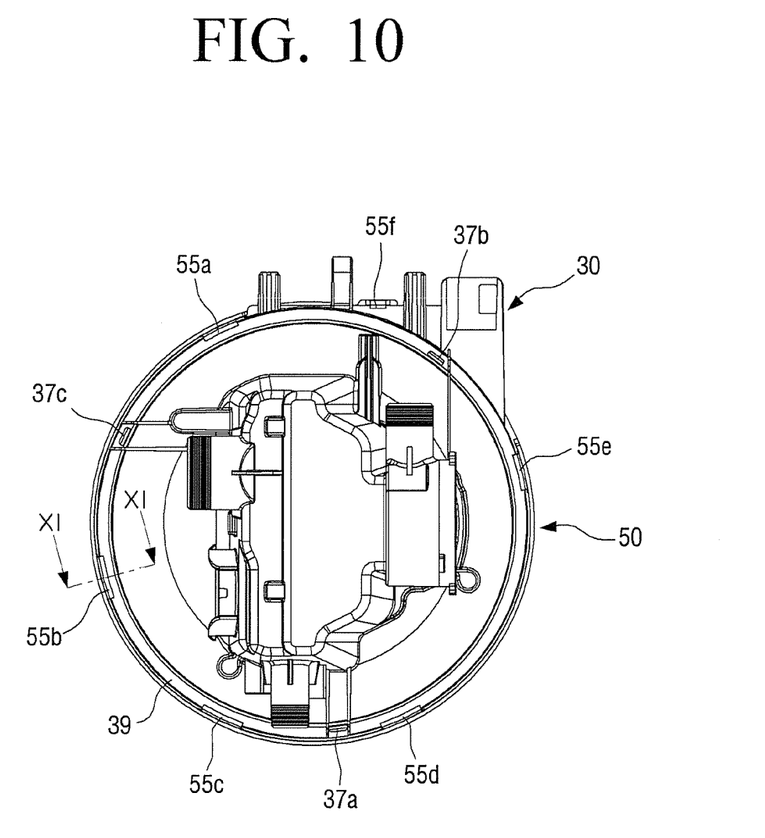
FIG. 10 is a bottom view illustrating a sealing apparatus, according to an embodiment of the present disclosure, coupled to a top portion of a pump chamber.

As illustrated in FIG. 9, once the protecting member 50 is coupled to the top portion 31 of the pump chamber 30 after the packing member 40 is received to the top portion 31 of the pump chamber 30, the plurality of hooks 55a, 55b, 55c, 55d, 55e, and 55f are detachably snap-coupled to the step portion 39 of the top portion 31 of the pump chamber 30 as illustrated in FIG. 10.

Referring to FIG. 11, when the protecting member 50 is coupled to the top portion 31 of the pump chamber 30, as described above, the first portion 51 of the protecting member 50 presses the hooking portion 45 of the packing member 40 toward the inner protrusion 33b. In some embodiments, the first portion 51 is formed to have a wider width so that the first portion 51 presses and fixes both the hooking portion 45 and the upper portion of the packing member 40.

Figure 12:
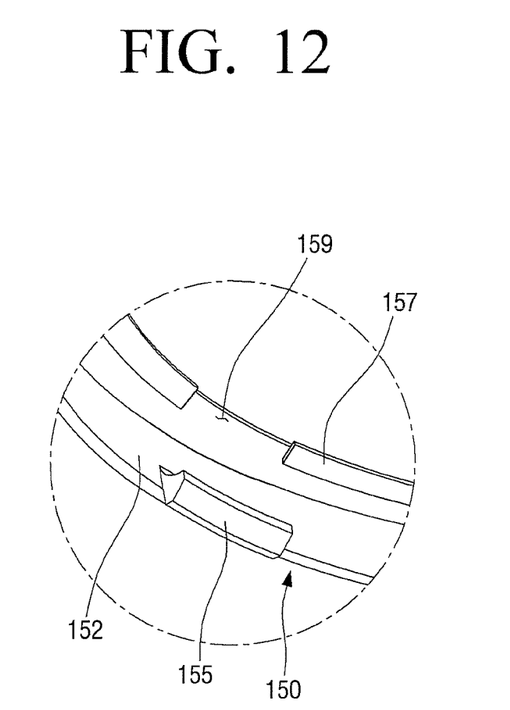
FIG. 12 is a partially enlarged perspective view illustrating another example of the protecting member of FIG. 7.

The protecting member 50 is formed to have the plurality of drain holes 53a, 53b, 53c, 53d, 53e, and 53f in the first portion 51 for draining water, but the protecting member 50 is not limited thereto. As illustrated in FIG. 12, in certain embodiments, a drain structure of a protecting member 150 includes at least one cutting groove 159 without the plurality of drain holes 53a, 53b, 53c, 53d, 53e, and 53f.

In certain of those embodiments, the cutting groove 159 of the protecting member 150 is formed by cutting some part of a step portion 157 formed along the bottom surface of the first portion 151 in the horizontal direction.

The protecting member 150 includes a first portion 151 and a second portion 152 similarly to the protecting member 50 as described above, and a plurality of hooks 155 is formed along the second portion 152.

Figure 13:
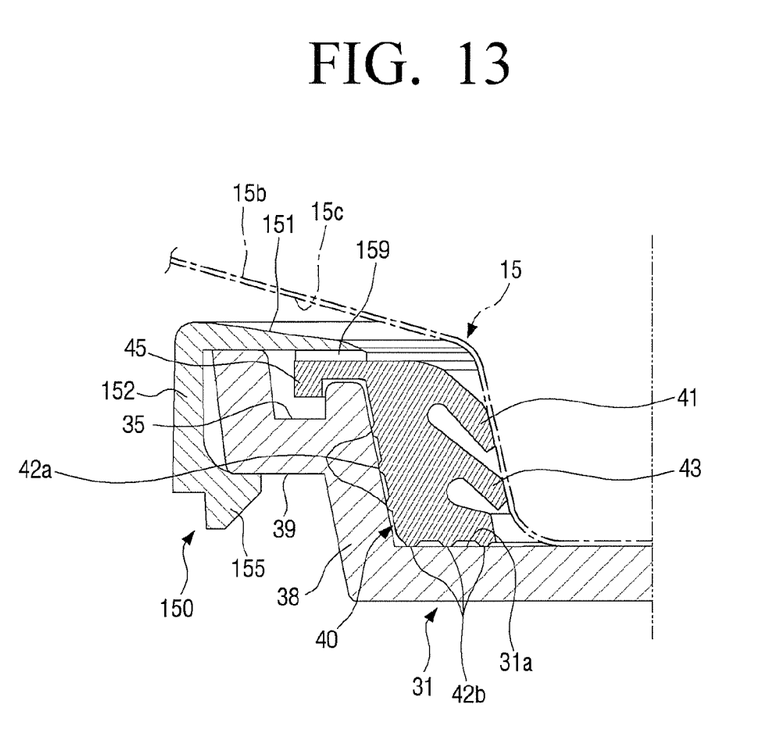
FIG. 13 is a cross-sectional view illustrating a pump chamber to which the protecting member illustrated in FIG. 12 is applied.

Referring to FIG. 13, the protecting member 150 is detachably coupled to the top portion 31 of the pump chamber 30 by the hook 155 after the packing member 40 is received in the receiving groove 31a of the top portion 31 of the pump chamber 30.

In this case, the cutting groove 159 formed in the first portion 151 forms a discharge passage in conjunction with the top surface of the hooking portion 45 of the packing member 40. Accordingly, water droplets which are formed on the outer surface 15c of the bottom surface 15 of the washing tank 13 or flow down along the outer surface 15c are discharged to the channel 35 through the cutting groove 159 of the first portion 151.

In certain embodiments, the cutting groove 159 is formed at a position corresponding to the hook 155, and in certain other embodiments, the cutting groove 159 is formed at a position which does not correspond to the hook 155.

As described above, in the present disclosure, when the bottom surface 15 of the washing tank 13 and the pump chamber 30 are assembled to each other, the packing member 40 is prevented from moving from the receiving groove 31a formed in the top portion 31 of the pump chamber 30 by the protecting member 50.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A sealing apparatus that seals between a pump chamber and a bottom surface of a washing tank of a dishwasher, the sealing apparatus comprising:
    a packing member disposed along a top portion of the pump chamber; and
    a protecting member which connects some portion of the packing member to the pump chamber such that it prevents the packing member from moving when the bottom surface of the washing tank and the pump chamber are coupled to each other,
    wherein at least one discharge passage is formed between the packing member and the protecting member and the at least one discharge passage guides water from an outer surface of the bottom surface of the washing tank to a channel formed in the pump chamber.

2. The sealing apparatus of claim 1, wherein the protecting member is detachably coupled to the pump chamber.

3. The sealing apparatus of claim 2, wherein the protecting member comprises a plurality of hooks that are snap-coupled to a portion of the pump chamber.

4. The sealing apparatus of claim 3, wherein the protecting member comprises:
    a first portion that covers an upper portion of the packing member; and
    a second portion comprising the plurality of hooks.

5. The sealing apparatus of claim 4, wherein the first portion comprises an inclined surface that corresponds to a slope of the bottom surface of the washing tank.

6. The sealing apparatus of claim 4, wherein the second portion is disposed on an outer circumference of the top portion of the pump chamber.

7. The sealing apparatus of claim 4, wherein the first portion comprises the at least one discharge passage.

8. The sealing apparatus of claim 7, wherein the at least one discharge passage comprises at least one drain hole that passes through the first portion of the protecting member.

9. The sealing apparatus of claim 7, wherein the at least one discharge passage comprises a cutting groove that is cut from a step portion formed in a bottom surface of the first portion.

10. The sealing apparatus of claim 1, wherein:
    the packing member comprises a hooking portion that extends from the packing member and is operable to be disposed around the channel of the pump chamber, and
    the protecting member comprises a first portion to cover the hooking portion and a second portion that comprises a plurality of hooks operable to be snap-coupled to a portion of the pump chamber.

11. A dishwasher comprising:
    a main body comprising a washing tank which receives things to be washed and a pump chamber connected with a bottom surface of the washing tank such that fluid can pass between the washing tank and the pump chamber;
    a door that opens and closes the washing tank; and
    a sealing apparatus for sealing the pump chamber and the bottom surface of the washing tank, wherein the sealing apparatus comprises:
    a packing member disposed along a top portion of the pump chamber; and
    a protecting member that connects some portion of the packing member to the pump chamber such that the packing member is prevented from moving when the bottom surface of the washing tank and the pump chamber are coupled to each other, and wherein at least one discharge passage is formed between the packing member and the protecting member and the at least one discharge passage guides water from an outer surface of the bottom surface of the washing tank to a channel formed in the pump chamber.

12. The dishwasher of claim 11, wherein
the protecting member comprises:
a first portion that covers an upper portion of the packing member; and
a second portion comprising a plurality of hooks that are operable to be detachably coupled to the pump chamber.

13. The dishwasher of claim 12, wherein the first portion comprises at least one drain hole operable to guide water from an outer surface of the bottom surface of the washing tank to a channel formed in the pump chamber.

14. The dishwasher of claim 12, wherein the first portion comprises a cutting groove that is cut from a step portion formed in a bottom surface of the first portion, the cutting groove operable to guide water from an outer surface of the bottom surface of the washing tank to a channel formed in the pump chamber.

15. The dishwasher of claim 11, wherein
the packing member comprises a hooking portion that is operable to be disposed around a channel of the pump chamber, the hooking portion extending from the packing member, and
the protecting member connects to the hooking portion such that the hooking portion is prevented from moving.

\* \* \* \* \*